Dec. 21, 1965
E. L. NOOKER ETAL
3,225,172
RESISTANCE WELDING PROCESS
Filed May 26, 1961
3 Sheets-Sheet 1
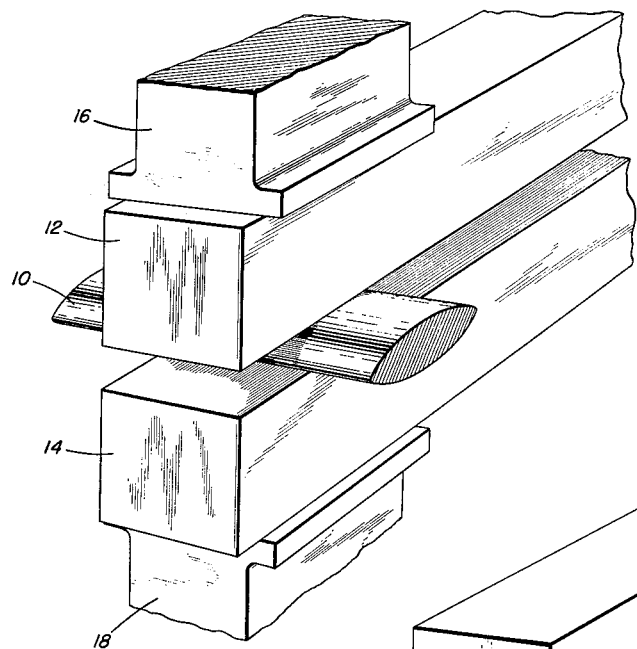
FIG. 1.
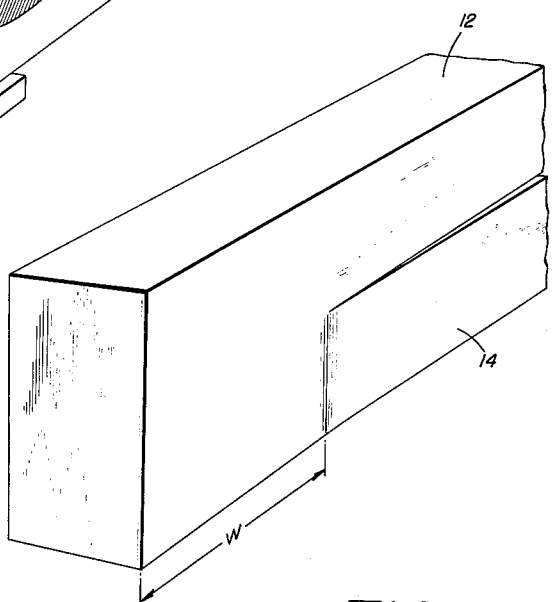
FIG. 2.
FIG. 3.
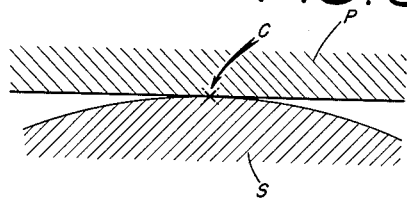
FIG. 4.
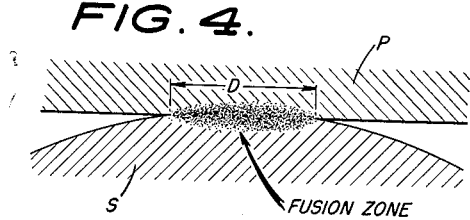
GEORGE W. GALLOWAY
EUGENE L. NOOKER
INVENTORS
BY W. O. Dusenberry
Claude Funkhouser
ATTORNEYS Dec. 21, 1965   E. L. NOOKER ETAL   3,225,172
RESISTANCE WELDING PROCESS
Filed May 26, 1961                    3 Sheets-Sheet 2

GEORGE W. GALLOWAY
EUGENE L. NOOKER
INVENTORS

BY
ATTORNEYS

Dec. 21, 1965   E. L. NOOKER ETAL   3,225,172
RESISTANCE WELDING PROCESS

Filed May 26, 1961   3 Sheets-Sheet 3

GEORGE W. GALLOWAY
EUGENE L. NOOKER
INVENTORS

BY W. O. Lusenberry
Claude Funkhouser
ATTORNEYS 3,225,172
RESISTANCE WELDING PROCESS
Eugene L. Nooker, Silver Spring, Md., and George W. Galloway, Arcadia, Calif., assignors to the United States of America as represented by the Secretary of the Navy
Filed May 26, 1961, Ser. No. 113,592
1 Claim. (Cl. 219—94)

This invention relates generally to resistance welding; more particularly, it relates to an improved resistance welding process wherein the value of the electrical resistance of the material being welded is automatically controlled during the welding cycle.

In certain applications it has been found desirable to weld two pieces of material of substantial thickness by resistance welding. Such a method is especially desirable in structures where a very large number of welds must be made. In some such structures the welds must each possess high strength, and all of the welds must have substantially the same strength and metallurigcal structure. In the past it has been difficult to obtain a large number of uniform quality welds by the resistance welding method.

In resistance welding heat is generated by passing an electric current through the work to be welded, the work being one part of a complete electrical circuit which also includes the welding machine. Heat results from resistance of the work to the current flow. Pressure is applied to the work simultaneously with the flow of current, the welding action then resulting from the combination of heat and pressure. A number of parameters are involved in resistance welding which will affect the quality of the resultant weld, such as the size of the work pieces, their configuration and surface condition, and the total electrical resistance of the work. Obviously, these parameters must be adequately controlled if a large number of uniform quality welds are to be made.

The size, configuration, composition and surface finish of the work pieces can be controlled within very precise tolerances during manufacture. The present invention provides a method of controlling the total electrical resistance of the work during the welding cycle, which in turn permits control of the temperature of the welding zone. By controlling the temperature of the welding zone during the welding cycle it is possible to obtain welds having a desired metallurgical structure and strength.

The instant process is dependent upon certain geometric relationships of the materials to be welded, and hence a large number of uniform quality welds can be made if the physical configurations of the work pieces are maintained within specified tolerances.

It is, therefore, the principal object of this invention to provide a resistance welding process for making a large number of uniform quality welds of a desired metallurgical structure and strength.

It is also an object of the invention to provide a resistance welding process that will rapidly and economically produce welds having a desired metallurgical structure and strength.

Another object of the invention is to provide a resistance welding process wherein the value of the electrical resistance of the material being welded is automatically controlled during the welding cycle.

Other objects and many of the attendant advantages of the invention will be readily appreciated as the same becomes better understood by reference to the following detailed description when considered in connection with the accompanying drawings, wherein:

FIG. 1 is a perspective view showing the relative positions of the work pieces and the welding machine electrodes prior to the making of a weld;

FIG. 2 is a perspective view of the work pieces of FIG. 1 after the weld has been made;

FIG. 3 is an enlarged diagrammatic view in section, showing the mating surfaces between a shim and a work piece when they are in pre-welding position;

FIG. 4 is a diagrammatic view similar to FIG. 3, showing the mating surfaces between a shim and a work piece during the welding cycle;

Figure 5:
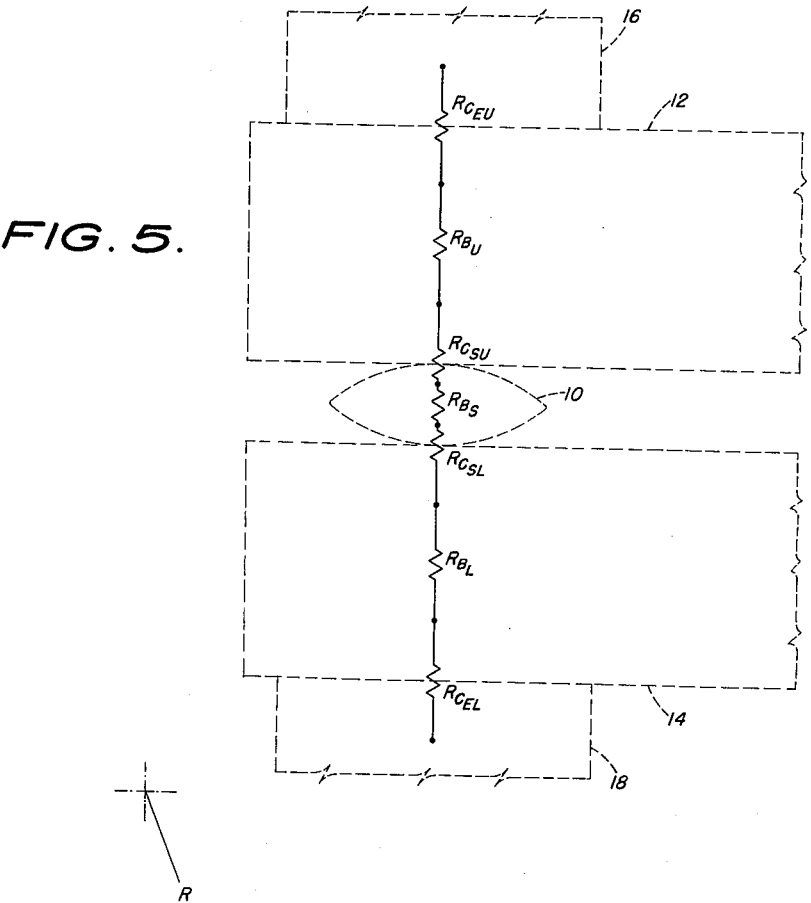
FIG. 5 is a schematic diagram, with a pair of electrodes, two work pieces, and a shim being indicated in broken lines, showing the electrical resistance characteristics of the weld region.

In resistance welding the welding action is produced by heat obtained from the resistance of the work to flow of electric current, and by the application of pressure. The heat produced can be determined from the formula $$H = I^2 R_T T$$

wherein:

$H$ = heat generated in joules
$I$ = current in r.m.s. amperes
$R_T$ = total resistance of the work in ohms
$T$ = time of current flow in seconds The formula shows that the heat generated is proportional to the square of the welding current and directly proportional to the resistance and the time. The welding current and the time for any particular weld are controlled by the welding machine employed. The present invention provides a method for controlling the value of the resistance of the work.

In the invention a shim is initially disposed between the two pieces of work to be welded. The shim serves two functions. First, it provides additional metal for making the weld, thereby insuring that the physical dimensions of the work pieces will not be reduced. Secondly, and more importantly, the shim provides a means for controlling the total resistance of the work. Referring to FIG. 1, a shim 10 is shown disposed between an upper work piece 12 and a lower work piece 14, the work pieces 12 and 14, and the shim 10, being disposed between an upper electrode 16 and a lower electrode 18. FIG. 1 represents the position of these elements just prior to the making of the weld. The work pieces are shown in perspective in FIG. 2 after welding, the weld region being indicated by the dimension W.

The total electrical resistance of the work is composed of two classes of resistance. The first is the body resistance of the work pieces and the shim. The value of the body resistance is, generally, directly proportional to temperature. Hence, as the temperatures of the work pieces and the shim increase during the welding cycle, the value of the body resistance will increase.

The second class of resistance is contact resistance, or the resistance between the mating faces of the work pieces and the electrodes, and the work pieces and the shim. The value of the contact resistance is, generally, directly proportional to temperature, and inversely proportional to the area of the mating surfaces in contact. Thus, as temperature increases, the contact resistance increases in value, and as the area of contact increases, the contact resistance decreases in value.

The total electrical resistance of the work, or $R_T$, is, as indicated above, composed of the sum of individual body resistances and the individual contact resistances, expressed mathematically as:

$$R_T = R_{Body} + R_{Contact}$$

where:

$R_T$ = the total resistance of the work
$R_{Body}$ = the additive total of the individual body resistances of the individual elements comprising the work
$R_{Contact}$ = the additive total of the individual contact resistances between the opposed mating surfaces of each pair of elements In the usual welding situation the total contact resistance value will normally be several times the value of the total body resistance.

If the temperature of the work remained constant throughout the welding cycle, no change in the value of the resistance of the work would occur from temperature causes. However, drastic temperature changes are present, and are necessary if fusion is to occur. The temperature changes occurring tend to change the value of the total resistance, which alters the amount of heat generated, which in turn affects the quality of the weld.

This invention contemplates the controlling of the value of the total resistance by controlling the value of the total contact resistance. Since the contact resistance increases, generally, in direct proportion to temperature and in inverse proportion to contact area, it has been found that by causing the contact area to increase as welding progresses it is possible to maintain the contact resistance at any desired value. By thus controlling the contact resistance it is possible to compensate for changes in body resistance, and hence the total work resistance can be maintained at a constant value or be made to vary as desired.

The manner in which contact resistance is controlled is illustrated by FIGS. 3 and 4, wherein a portion of work piece P and a portion of a shim S are shown in section, the shim S being similar to the shim 10 of FIG. 1. FIG. 3 indicates the positions of the work piece P and the shim S just prior to welding, the work piece and the shim being in line contact at C. In FIG. 4, the welding cycle is partially completed. During welding, the temperature of the weld zone increases as current flows through the work. This increase in temperature tends to increase the value of the total resistance of the work. However, as is shown in FIG. 4, as welding progresses the pressure applied by the welding machine urges the shim S into the work piece P, which action increases the contact area between the mating surfaces. This increased contact area, indicated in FIG. 4 by the dimension D, causes the value of the contact resistance at the mating surfaces to decrease, which will tend to decrease the total work resistance. By properly proportioning the geometric configuration of the shim it is possible to maintain the total work resistance at practically any desired value. Such control over the total resistance permits control over the heat present in the weld zone at any particular instant during the weld cycle, and hence allows for the obtaining of a desired metallurgical structure in the resultant weld.

In order to better understand the resistance characteristics present in the making of a weld according to the invention, reference is made to the schematic diagram of FIG. 5. The diagram indicates the individual resistances present in the weld set-up illustrated in FIG. 1, the work pieces 12 and 14, the shim 10, and the electrodes 16 and 18 being indicated by broken lines. As indicated above;

$$R_T = R_{Body} + R_{Contact}$$

From an examination of FIG. 5 it can be seen that;

$$R_{Body} = R_{B_U} + R_{B_S} + R_{B_L}$$

wherein:

$R_{B_U}$ = the body resistance of the upper work piece
$R_{B_S}$ = the body resistance of the shim
$R_{B_L}$ = the body resistance of the lower work piece Similarly, it is seen that;

$$R_{Contact} = R_{C_{EU}} + R_{C_{SU}} + R_{C_{SL}} + R_{C_{EL}}$$

where:

$R_{C_{EU}}$ = the contact resistance at the interface between the upper electrode and the upper work piece
$R_{C_{SU}}$ = the contact resistance at the interface between the shim and the upper work piece
$R_{C_{SL}}$ = the contact resistance at the interface between the shim and the lower work piece
$R_{C_{EL}}$ = the contact resistance at the interface between the lower electrode and the lower work piece In the welding set-up of FIGS. 1 and 3, the value of the total resistance $R_T$ is controlled by controlling the contact resistances $R_{C_{SU}}$ and $R_{C_{SL}}$.

The subject welding process is particularly adaptable to the making of welds between the overlapped ends of two steel rods, such as are employed in continuous rod warhead projectiles of the type disclosed in copending application Serial Number 106,424, filed April 28, 1961, and entitled "Warhead Projectile," now Patent No. 3,160,099. This process provides a weld that extends the full width of such rods, as distinguished from the spot-type weld usually obtained when resistance welding is employed.

The shim employed in the process may be either a separate piece of material, or it can be formed integral with one, or both, of the work pieces. The shim is straight and elongated, the length thereof determining the extent of the welding zone. It has at least one protuberance extending throughout its length. The crest of the proturberance normally is a straight line, and extends parallel to and lies in the same plane as the longitudinal axis of the shim. The straight line characteristic of the proturberances insures an initial line contact between the shim and a mating work piece, assuming the mating surface of the work piece is planar. The geometric cross-sectional configuration of the protuberance must be such as to provide for an increasing contact area between the mating surfaces as welding progresses. The precise geometric shape of the protuberance can be determined experimentally, the shape being dependent upon the materials employed, the desired welding temperature, the welding pressure, and other factors.

Figure 6:
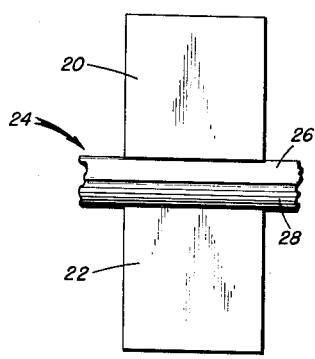
FIG. 6 is an end elevation of two work pieces with a separate shim positioned therebetween.
Figure 7:
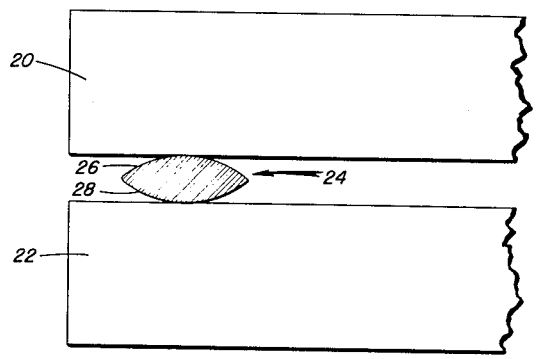
FIG. 7 is a side elevation of the work pieces and a separate shim of FIG. 6.
Figure 8:
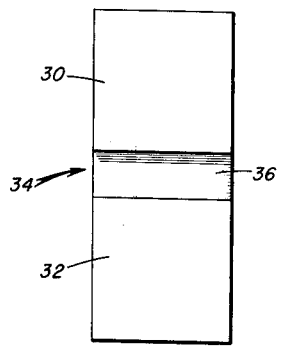
FIG. 8 is an end elevation of two work pieces with an integral shim positioned therebetween.
Figure 9:
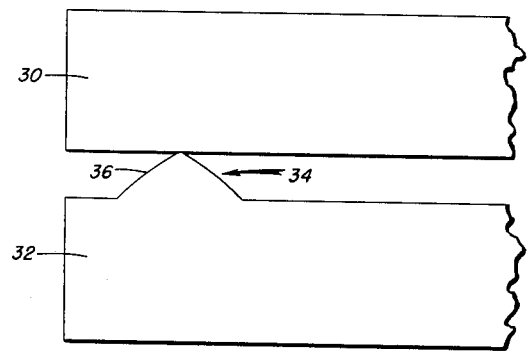
FIG. 9 is a side elevation of the work pieces and integral shim of FIG. 8.
Figure 10:
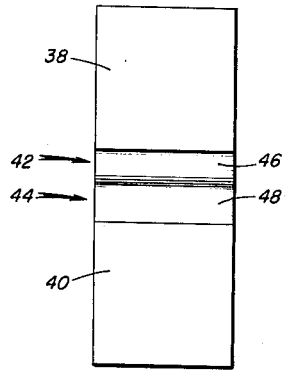
FIG. 10 is an end elevation of two work pieces with a pair of integral shims positioned therebetween.
Figure 11:
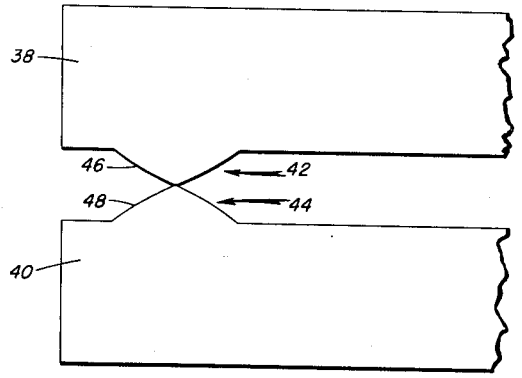
FIG. 11 is a side elevation of the work pieces and integral shims of FIG. 10.

Typical shims are shown in pre-welding positions in FIGS. 6–11. In FIGS. 6 and 7 a separate shim 24, having two protuberances 26 and 28 thereon, is shown disposed between an upper rectangular rod 20 and a lower rectangular rod 22, FIG. 6 being an end elevation view and FIG. 7 a side elevation view. In FIGS. 8 and 9 an integral shim 34 is shown in end elevation and side elevation, respectively, said shim being integral with a lower rod 32 and having a protuberance 36 thereon, the protuberance being in engagement with the mating surface of an upper rod 30. Two integral shims 42 and 44 are shown in FIGS. 10 and 11, the shim 42 being integral with an upper rod 38 and the shim 44 being integral with a lower rod 40. The shims 42 and 44 have protuberances 46 and 48, respectively, thereon, which protuberances are shown in contact.

The subject welding process is carried out by first providing a shim between the work pieces to be welded. The shim may be integral or separate in nature. In either case, it has at least one protuberance thereon, and the crest of that protuberance is brought in contact with the surface of one of the work pieces. A pair of electrodes is then disposed about the work pieces in the region of the shim, as is illustrated in FIG. 1, and current is passed through the work while at the ame time pressure is exerted to urge the work pieces together.

By way of example only, and to provide a better understanding of the invention, apparatus, material and condition specifications for a typical weld process done according to the teaching of the invention will now be described.

Figure 12:
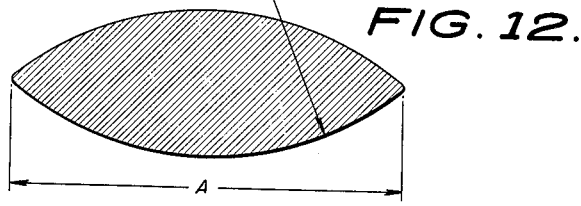
FIG. 12 is an enlarged view, in cross-section, of a separate shim, showing the relative dimensions thereof.

The process is described relative to the welding of the overlapped ends of a pair of rectangular steel rods, such as are shown in FIG. 1. It is desired to obtain a weld wherein complete fusion exists in the region where the shim is initially positioned, and in which the metallurgical structure of such regions is completely recrystallized ferrite. A separate shim is employed, and the cross-sectional configuration of the shim is shown in FIG. 12, said configuration having been determined experimentally.

The apparatus, material and condition specifications for making the desired weld are—

Welding machine: Press-type projection welder, such as Model PT3P–18–200 SOAR, manufactured by the Acme Electric Welder Company.

Rod material: S.A.E. 1008 steel rod, ¼" x ¼", having a Rockwell B hardness of about 75 and a good, clean surface finish as well as accurate cross-sectional geometry.

Shim material: Referring to FIG. 12 of the drawing, the shim dimensions for use with rod of the specified size and composition should be:

$$R = 0.1135'', A = 0.142'' \pm 0.002''$$

Welding machine settings:
1. Ram force = 1850 lbs.,
2. Cycles squeeze = 100,
3. Cycles hold = 0,
4. Percent heat = 39% at high tap,
5. Cycles of weld = 26,
6. Gap setting = 0.375",
7. Ram speed = slow gravity fall of ram until upper electrode touches rod, then full 1850 lbs. force.

In summary, it should be noted that if the shim and the work pieces are manufactured within close tolerances an unlimited number of substantially identical welds can be made by the subject process. The welding machine controls need be set but once, and thereafter substantially identical welds will be made for so long as the geometry of the work pieces and shim are maintained within specified tolerances.

Obviously, many modifications and variations of the present invention are possible in the light of the above teachings. It is therefore to be understood that within the scope of the appended claim the invention may be practiced otherwise than as specifically described.

What is claimed is:

A method for resistance welding two pieces of material of substantial thickness in which the value of the total electrical resistance of the work is maintained substantially constant, consisting of; placing an elongated shim on one of said pieces of material, said shim having a length corresponding to the width of the weld region and having thereon at least one protuberance extending throughout its length and terminating in a crest line extending parallel to and lying in the same plane as the longitudinal axis of the shim, positioning the other of said pieces of material over said first-mentioned piece and said shim so that said crest line is in line contact with said other piece, positioning said pieces of material and said shim between a pair of spaced opposed electrodes so that said electrodes contact the outer surfaces of said pieces in the region of said shim, exerting pressure upon said electrodes to clamp said pieces and said shim therebetween, simultaneously with the exertion of said pressure passing an electric current from one of said electrodes through said pieces and said shim to the other of said electrodes for creating heat sufficient to cause fusion of said two pieces and said shim to begin at said line of contact between said other piece and said crest, and maintaining said pressure until said shim and said pieces of material are completely fused, the maintenance of said pressure urging said shim into said other piece of material whereby as welding progresses the area of contact between said shim and said other piece increases and resistance therebetween decreases and with increases in temperature the resistance across said pieces and shim increases.

References Cited by the Examiner
UNITED STATES PATENTS

| | | | |
|---|---|---|---|
| 497,808 | 5/1893 | Moxham | 219—106 |
| 1,039,135 | 9/1912 | Johnson | 219—94 |
| 2,086,985 | 7/1937 | Mitchell | 219—93 |
| 2,897,340 | 7/1959 | Krieger | 219—93 |
| 3,024,347 | 3/1962 | Esser | 219—94 |

RICHARD M. WOOD, *Primary Examiner.*

CARL D. QUARFORTH, REUBEN EPSTEIN,
*Examiners.*

OSCAR R. VERTZ, R. L. GOLDBERG,
*Assistant Examiners.*